US007909910B2

(12) United States Patent
Benner

(10) Patent No.: US 7,909,910 B2
(45) Date of Patent: Mar. 22, 2011

(54) VACUUM LINE CLEAN-OUT SEPARATOR SYSTEM

(75) Inventor: Stephen J. Benner, Lansdale, PA (US)

(73) Assignee: TBW Industries Inc., Furlong, PA (US)

( * ) Notice: Subject to any disclaimer, the term of this patent is extended or adjusted under 35 U.S.C. 154(b) by 725 days.

(21) Appl. No.: 11/973,183

(22) Filed: Oct. 5, 2007

(65) Prior Publication Data

US 2008/0092734 A1 Apr. 24, 2008

Related U.S. Application Data

(60) Provisional application No. 60/849,896, filed on Oct. 7, 2006.

(51) Int. Cl.
*B01D 46/30* (2006.01)

(52) U.S. Cl. .................. 95/25; 55/423; 55/428; 55/429; 96/26; 96/271; 96/408

(58) Field of Classification Search ............. 55/DIG. 14, 55/DIG. 27, 270, 315, 421, 424, 428, 429, 55/430, 431, 432, 447, 448, 459.1; 95/1, 95/14, 19, 23, 24, 25, 26, 267, 269, 271; 96/228, 397, 405, 408, 417, FOR. 166; 210/787, 210/788

See application file for complete search history.

(56) References Cited

U.S. PATENT DOCUMENTS 3,318,075 A 5/1967 Wilson
3,842,461 A * 10/1974 Wurster .......................... 15/326
4,201,256 A * 5/1980 Truhan ....................... 144/252.2
4,227,893 A * 10/1980 Shaddock ....................... 95/268
4,564,374 A * 1/1986 Hofmann .......................... 95/24
4,574,420 A * 3/1986 Dupre ............................ 15/331
4,670,139 A * 6/1987 Spruiell et al. ........... 210/167.31
4,800,612 A 1/1989 Valentine
4,820,315 A * 4/1989 DeMarco ........................ 95/268
4,963,172 A * 10/1990 DeMarco ........................ 55/429
5,030,259 A 7/1991 Bryant et al.
5,034,038 A 7/1991 Olson
5,062,868 A 11/1991 Kennedy
5,062,870 A 11/1991 Dyson
5,125,125 A 6/1992 Barsacq
5,147,610 A 9/1992 Watanabe et al.
5,277,705 A * 1/1994 Anderson et al. ............... 55/319
5,403,473 A 4/1995 Moorehead et al.
5,492,407 A 2/1996 Gement
5,916,010 A 6/1999 Varian et al.

(Continued)

*Primary Examiner* — Duane Smith
*Assistant Examiner* — Sonji Turner
(74) *Attorney, Agent, or Firm* — Wendy W. Koba

(57) ABSTRACT

A vacuum clean-out system including a separator chamber and associated collection chamber for removing liquid material and debris from a vacuum output and providing a vacuum return line free of contaminants. A vacuum exhaust line is coupled to a cyclonic separator chamber that induces a circular rotation within the incoming vacuum stream, causing the liquid and debris to impinge the chamber's surfaces and fall to the bottom thereof while the "clean" vacuum is drawn upwards into a return line. The collection chamber is maintained at the same negative pressure as the separator chamber so that the accumulating liquid and debris easily drains into the collection chamber. A sensor associated with the collection chamber may be used to determine when the collection chamber is full and needs to be discharged. At that point, the separator chamber is isolated from the collection chamber, the collection chamber is vented and the accumulated material is discharged and/or analyzed. Advantageously, the separator chamber remains under negative pressure and continues the vacuum clean-out process uninterrupted.

16 Claims, 4 Drawing Sheets

U.S. PATENT DOCUMENTS

| | | | | |
|---|---|---|---|---|
| 5,922,093 | A | 7/1999 | James et al. | |
| 6,004,196 | A | 12/1999 | Doan et al. | |
| 6,045,618 | A | 4/2000 | Raoux et al. | |
| 6,190,236 | B1 | 2/2001 | Drill | |
| 6,217,430 | B1 | 4/2001 | Koga et al. | |
| 6,237,186 | B1 | 5/2001 | Griffiths | |
| 6,244,944 | B1 | 6/2001 | Elledge | |
| 6,276,452 | B1 | 8/2001 | Davis et al. | |
| 6,287,174 | B1 | 9/2001 | Detzel et al. | |
| 6,331,136 | B1 | 12/2001 | Bass et al. | |
| 6,354,241 | B1 | 3/2002 | Tanaka et al. | |
| 6,358,124 | B1 | 3/2002 | Koga et al. | |
| 6,409,803 | B1 * | 6/2002 | Tremel et al. | 95/271 |
| 6,440,317 | B1 * | 8/2002 | Koethe | 210/774 |
| 6,558,238 | B1 | 5/2003 | Crevasse et al. | |
| 6,562,109 | B2 | 5/2003 | Livingston et al. | |
| 6,716,261 | B2 * | 4/2004 | Carroll et al. | 55/337 |
| 6,818,033 | B2 * | 11/2004 | North | 55/345 |
| 6,833,016 | B2 * | 12/2004 | Witter | 55/337 |
| 6,837,942 | B2 | 1/2005 | Joslyn | |
| 6,887,290 | B2 * | 5/2005 | Strauser et al. | 55/283 |
| 6,916,236 | B2 | 7/2005 | Terpstra | |
| 6,936,085 | B2 * | 8/2005 | DeMarco | 55/324 |
| 6,945,855 | B2 | 9/2005 | Moore et al. | |
| 7,004,820 | B1 | 2/2006 | Teng et al. | |
| 7,014,670 | B2 | 3/2006 | Shutic et al. | |
| 7,025,663 | B2 | 4/2006 | Kim | |
| 7,052,599 | B2 | 5/2006 | Osuda et al. | |
| 7,063,603 | B2 | 6/2006 | Moore et al. | |
| RE39,195 | E | 7/2006 | Doan et al. | |
| RE40,048 | E * | 2/2008 | Witter | 55/337 |
| 7,343,643 | B2 * | 3/2008 | Kondo | 15/353 |
| 2003/0010708 | A1 | 1/2003 | Leocavallo et al. | |
| 2003/0159412 | A1 * | 8/2003 | North | 55/345 |
| 2004/0006953 | A1 | 1/2004 | Carroll et al. | |
| 2004/0055470 | A1 * | 3/2004 | Strauser et al. | 96/417 |
| 2004/0103785 | A1 * | 6/2004 | North | 95/271 |
| 2004/0188340 | A1 | 9/2004 | Appel et al. | |
| 2008/0092734 | A1 * | 4/2008 | Benner | 95/26 |

* cited by examiner 10
23
RINSE
VENT
25
VAC
OUT
26
21
24
WASTE IN
VACUUM LINE
19
14
28
16
12
EMERGENCY
SHUT-OFF
SENSOR
42
SEPARATOR
CHAMBER
18
36
20
22
VENT
30
34
33
HIGH LEVEL
SENSOR
40
COLLECTION
CHAMBER
32
38

VACUUM LINE CLEAN-OUT SEPARATOR SYSTEM

CROSS-REFERENCE TO RELATED APPLICATION

This application claims the benefit of U.S. Provisional Application No. 60/849,896, filed Oct. 7, 2006.

TECHNICAL FIELD

The present invention relates to a vacuum clean-out system and, more particularly, to a vacuum clean-out system including a multi-chamber arrangement for separating waste material from the vacuum stream and isolating the collected waste material from the vacuum flow, providing an uninterrupted vacuum return line free of contaminants.

BACKGROUND OF THE INVENTION

There are many applications, primarily industrial applications, where a vacuum system is used to hold semiconductor wafers in a fixture, create a controlled environment and/or remove various types of unwanted material. It is preferable to utilize a closed system where the negative pressure is constantly maintained and the removed material is separated out from the return vacuum flow so that the vacuum line returns to operation free from any contaminants which could otherwise cause problems with the vacuum pump.

Many appropriate vacuum systems are well known and used in the art, where such systems may be used in either a "dry" vacuum environment or a "wet" vacuum environment. A common problem with all systems, however, is the need to periodically clean the vacuum removal system to eliminate the particulate matter that has accumulated over time. In systems utilizing a separator as a holding tank for the particulate, the separator itself needs to be periodically cleaned, or the vacuum efficiency will begin to decrease and/or some of the particulate matter will pass through the separator and may re-enter the system.

Such periodic cleaning has previously been done by so-called "backflow" methods where a blast of pressure is directed in a reverse direction to unclog dry separators of any particulate matter. Such a system when used with a dry-type separator causes unnecessary mess due to particles or contaminants being blown out of the device into the environment or into a special receptacle. Such a system will still clog after a period of time and requires a manual teardown and reassembly of the separator to restore the proper vacuum flow through the system. Wet separators also require periodic shutdown of the system to drain and clean the separator and then replenish the separator material.

Thus, it would be desirable to develop a vacuum system that provides automatic, periodic cleaning of the accumulating waste in such a manner that the system does not need to be shut down, manually cleaned and then re-charged.

SUMMARY OF THE INVENTION

The need remaining in the art is addressed by the present invention which relates to a vacuum clean-out system and, more particularly, to a vacuum clean-out system including an arrangement for separating waste material from the vacuum stream and isolating the collected waste material from the vacuum flow, providing a vacuum return line of constant pressure and free of contaminants, and permitting the discharge of isolated waste material without interrupting the vacuum flow.

In accordance with the present invention, a vacuum line clean-out system comprises a separator chamber and a collection chamber coupled to the separator chamber, where the collection chamber can be periodically isolated from the separator chamber to discharge accumulated waste material without interrupting the vacuum clean-out process within the separator chamber.

In one embodiment of the present invention, the separator chamber is configured to induce a cyclonic flow within the incoming vacuum waste stream, causing the liquid and debris within the stream to impinge the chamber's surfaces and fall towards the bottom of the chamber, while the "clean" vacuum flow is drawn upwards into a clean vacuum return line. The collection chamber is connected to a drain output of the separator chamber and receives the liquid/debris as it moves downward out of the separator chamber. The collection chamber is also coupled to the vacuum return line to maintain the same negative pressure as the separator chamber, allowing the liquid/debris to easily drain.

A sensor may be used in association with the collection chamber to indicate when then collection chamber needs to be emptied (referred to as a discharge process). Alternatively, the discharge of the collection chamber may be manually controlled, or configured to occur on a periodic basis regardless of the volume of accumulated waste material.

It is an aspect of the present invention that the separator chamber is isolated from the collection chamber during the discharge process, thus allowing for the vacuum clean-out process to continue within the separator chamber during discharge. Any liquid/debris that accumulates during the discharge process will thus collect at the bottom of the separator chamber and be transferred to the collection chamber once the discharge process is completed, the negative pressure is re-established in the collection chamber and the connection between the two chambers is re-opened.

In one embodiment of the present invention, the vacuum return line within the separator chamber may further include a filtering element, pressure reducing orifice, and/or condensing elements to further ensure that any liquid and/or debris within the separator chamber is not permitted to enter the vacuum return line.

Various arrangements for introducing cyclonic flow into the inventive system may be used including, but not limited to, tapered inner walls within the separator chamber itself, or the inclusion of a diverter within the separator chamber for initiating the cyclonic action.

Other and further embodiments and features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
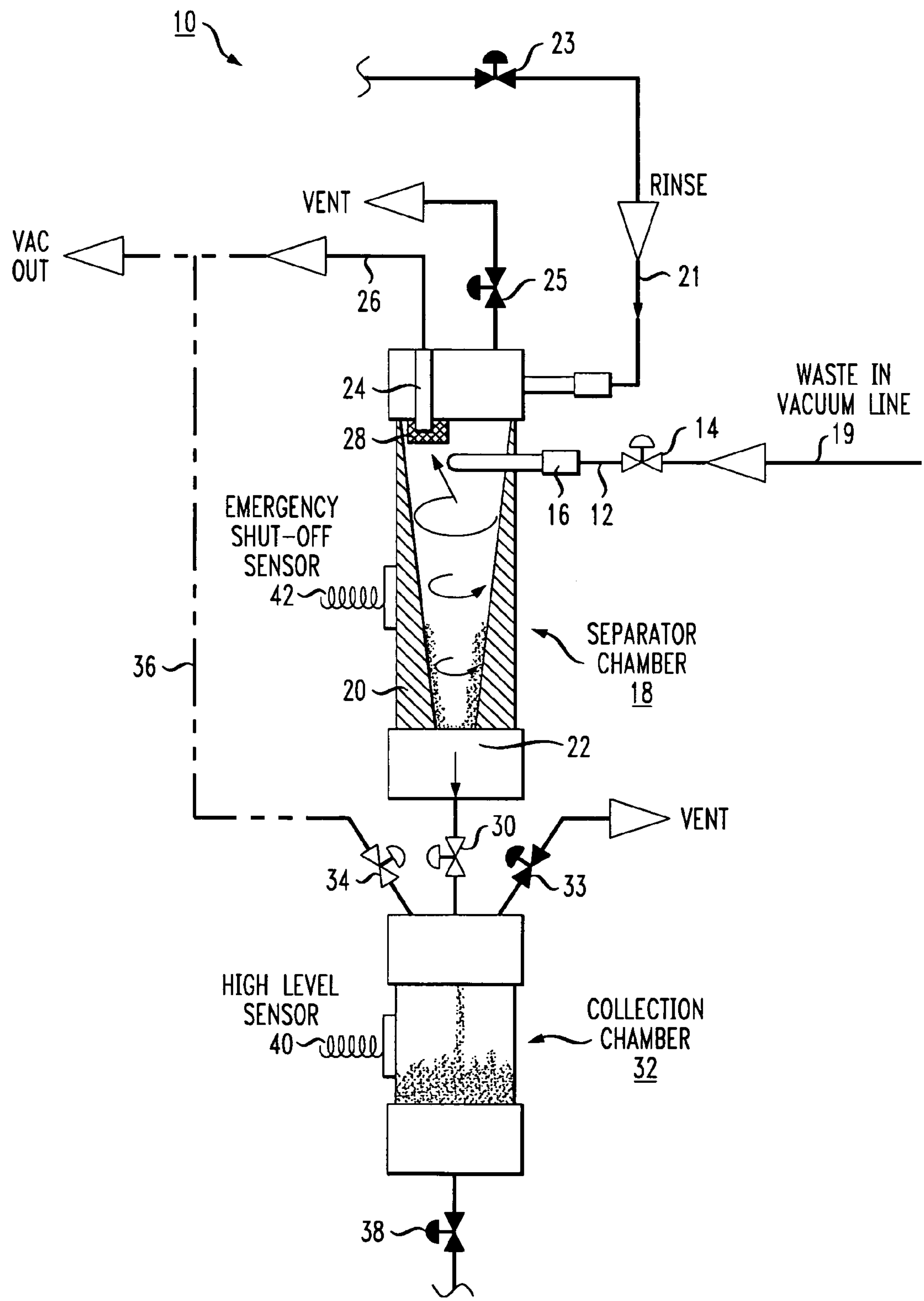
FIG. 1 shows, in detail, an exemplary vacuum line clean-out separator system formed in accordance with the present invention.

FIG. 1 illustrates an exemplary vacuum line clean-out separator system 10 formed in accordance with the present invention. System 10 is used to remove liquid waste material and debris from an associated industrial application (not shown), using a process vacuum line, such as vacuum line 19 shown in FIG. 1. System 10 functions in a manner that first separates out the liquid material and debris from the incoming vacuum flow within a separator chamber, then allows the liquid/debris to drain into an associated collection chamber while the "clean" vacuum is returned to the system via a clean vacuum return line. It is an important aspect of the present invention that system 10 is controlled by a number of valves and maintained under negative pressure (in both the separator and collection chambers) to ensure that the return vacuum line remains free of contaminants. Additionally, the valve controls of the system allow for the collection chamber to be periodically isolated from the separator chamber to permit the discharge of collected waste material without needing to shut down the vacuum clean-out process within the separator chamber.

Referring to FIG. 1, a first vacuum supply line 12, as controlled by a first valve 14, is used to draw the vacuum output from an associated application, such as any industrial application that utilizes a vacuum cleaning system. The vacuum output inevitably comprises fluids and/or debris that must be removed prior to recycling the vacuum flow back to the associated application. When first valve 14 is in the "open" position, the vacuum flowing along supply line 12 will be introduced through an input port 16 into a separator chamber 18. The various valves depicted in the associated drawings are shown in outline form to define an "open" valve, and shown in darkened form to define a "closed" valve.

In accordance with the teachings of the present invention, separator chamber 18 is formed to induce a cyclonic vacuum flow to efficiently remove the waste material from the vacuum. In this particular embodiment, separator chamber 18 is formed to include tapered walls, denoted by wall area 20 in FIG. 1. Therefore, when the vacuum flow enters separator chamber 18, tapered walls 20 will divert the flow of the vacuum into a cyclonic form. Other cyclonic flow configurations may be used, one alternative arrangement being illustrated in the alternative embodiment of FIG. 4.

Referring again to FIG. 1, as the vacuum input flow repeatedly circles within separator chamber 18, liquid material and debris will be forced against tapered wall area 20, and travel downward toward apex 22 of separator chamber 18. While the liquid material and debris are drawn towards apex 22, the filtered vacuum flow will be directed upward through an outlet port 24 and into a clean vacuum return line 26. To further ensure that the filtered vacuum flow is completely free of contaminants, a filter element 28 may be disposed to surround outlet port 24 and trap any remaining particulate debris.

In further accordance with the present invention, a second valve 30 is coupled to apex 22 of separator chamber 18 and is used to control the transfer of the accumulating liquid and debris into a connected collection chamber 32. In operation, second valve 30 will normally remain "opened", and only "close" when collection chamber 32 is full (determined in various ways, as described below). A third valve 34 is used to connect collection chamber to a vacuum line 36 that is coupled to clean vacuum return line 26 in the manner shown in FIG. 1. Vacuum line valve 34 is normally in the "open" position so that vacuum line 36 is coupled to collection chamber 32 and maintains a negative pressure within chamber 32. The presence of the negative pressure within collection chamber 32 allows for the waste material to quickly and efficiently drain from separator chamber 18 into collection chamber 32.

Figure 2:
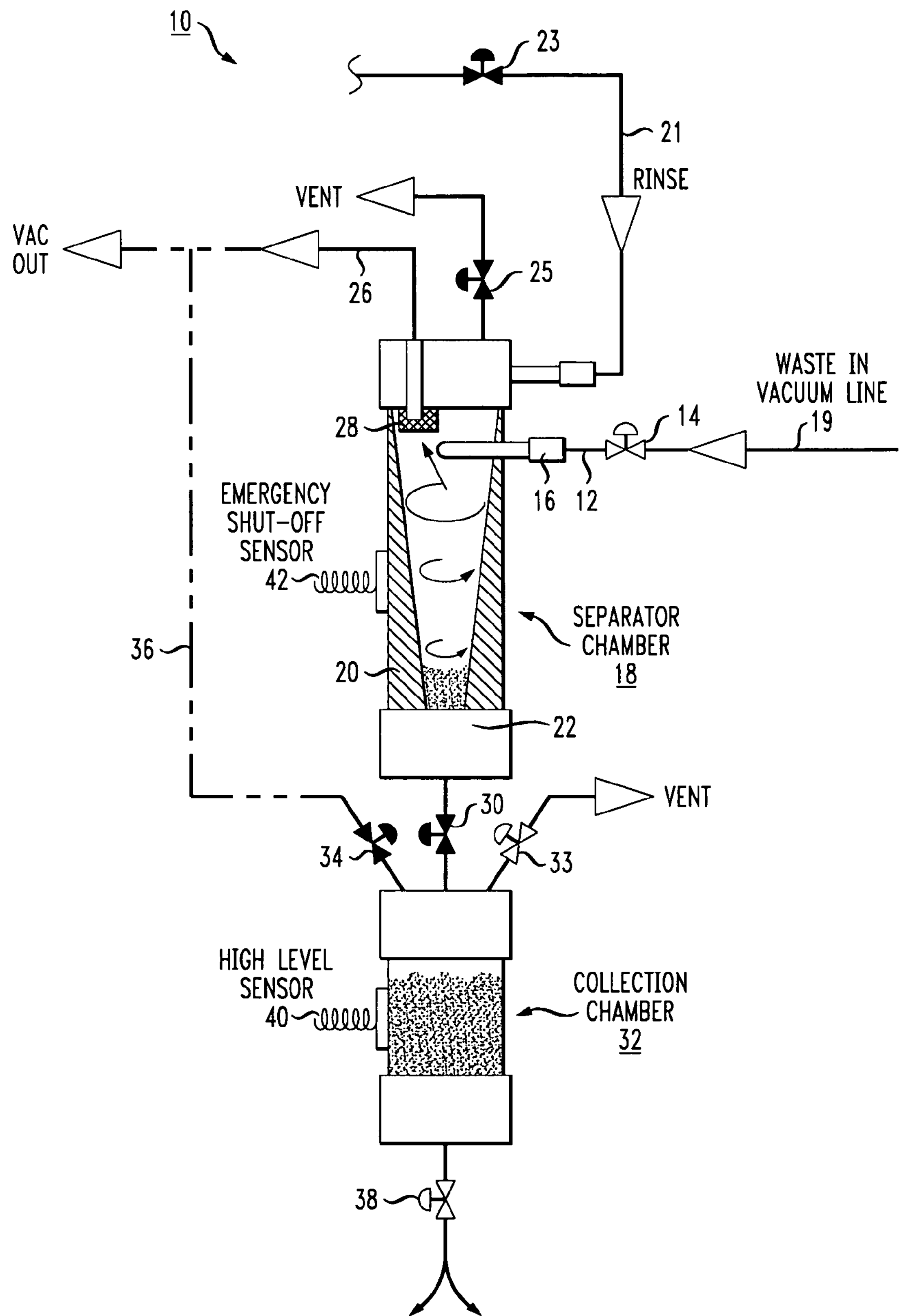
FIG. 2 illustrates the system of FIG. 1 at a point in time when the process of discharging the accumulated waste material from the collection chamber is initiated.

In order to prevent the accumulating waste material from overfilling collection chamber 32 and contaminating the return vacuum being drawn through vacuum line 36, a discharge process is periodically used to empty, sample or dose (i.e., solvent, pH adjustment, rinse, etc.) collection chamber 32. It is a significant aspect of the present invention that this discharge process occurs without affecting or needing to shut down the vacuum line clean-out process within separator chamber 18. FIG. 2 illustrates system 10 during the discharge process, particularly illustrating the settings of the various valves used to control the isolation between chambers 18 and 22. As shown, second valve 30 is actuated to close during the discharge process, isolating separator chamber 18 from collection chamber 32 while maintaining a vacuum (negative pressure) within separator chamber 18. Vacuum line valve 34 is also closed to prevent the accumulated waste from entering the return vacuum line. A vent valve 33 is opened to release the negative pressure and/or apply a positive pressure within collection chamber 32, and a drain valve 38 is opened to discharge the accumulated waster material from collection chamber 32.

Advantageously, the vacuum line clean-out process continues within separator chamber 18 uninterrupted while the discharge process is underway, since the chambers have been isolated and a negative pressure is maintained in separator chamber 18. Therefore, the inventive system may be periodically cleaned or sampled while not requiring the vacuum process itself to be shut down or affected, realizing a significant savings in terms of time and expense.

The discharge process may be manually controlled or provided under the control of a timer (for example, to initiate the discharge process every thirty minutes). Various other procedures for initiating and controlling the discharge process are possible and are considered to fall within the spirit and scope of the present invention.

Indeed, as shown in FIGS. 1 and 2, one alternative method of controlling the discharge process in accordance with the present invention utilizes a high level sensor 40 disposed along the sidewall of collection chamber 32. High level sensor 40 is utilized to monitor the rising level of liquid/debris as the vacuum system is in operation and trigger the initiation of the discharge process. Rather than sensing the "level" of the collecting liquid, other sensing arrangements may be used and are considered to fall within the scope of the present invention (for example, monitoring the weight of the collecting liquid). In any circumstance, however, sensor 40 is preferably configured to initiate the discharge process before the accumulating waste material nears the intake of vacuum line 36, thus preventing the intrusion of any debris into the return vacuum flow.

Additionally, as shown in FIGS. 1 and 2, an emergency shut-off sensor 42 may also be utilized in inventive system 10. In particular, emergency shut-off sensor 42 is coupled to separator chamber 18 and utilized to shut down the entire system should there be a breakdown such that the waste material accumulates within separator chamber 18 to an undesirable or dangerous level. System 10 may further include a rinse application, periodically used to wash off the walls of separator chamber 18 and/or collection chamber 32, to insure that all accumulated material is removed from the system. Referring to FIG. 1, one exemplary rinse application is shown as comprising a rinse water intake line 21, controlled by a rinse valve 23 and a vent valve 25. The rinse application is considered to improve the transport of the material through the system, where the rinse application may be controlled either manually or automatically, in a manner similar to the discharge process.

Figure 3:
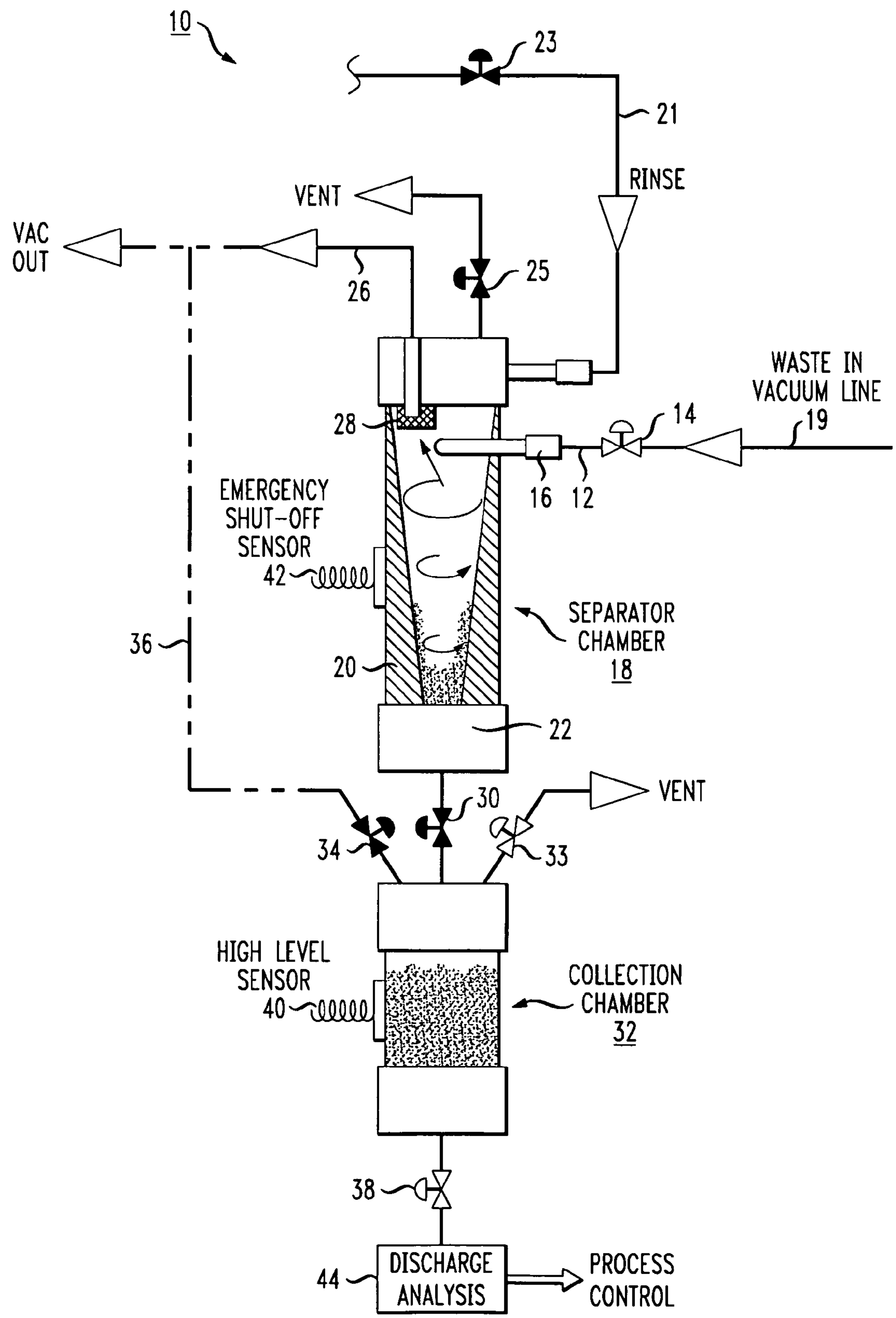
FIG. 3 illustrates an alternative embodiment of the present invention, including a discharge analysis system for evaluating the discharged waste material and utilizing the evaluation to control various aspects of the industrial application associated with the vacuum removal system.

FIG. 3 illustrates an alternative embodiment of the present invention where a discharge analysis unit 44 is coupled to collection chamber 32 through drain valve 38. In this embodiment, analysis unit 44 functions to sample and evaluate the liquid waste and contaminant debris. Various chemical and physical properties of the material may, for example, provide indications associated with the specific industrial application that would be useful in a feedback system to control the application. Alternatively, the specific properties of the waste material may be evaluated to determine the best disposal mechanism from an environmental point of view. The particular/specific uses of the waste analysis are considered to be ancillary to the subject matter of the present invention, which is directed to accumulating the waste material in a controlled fashion so that it can likewise be analyzed in a controlled system.

It is to be understood that the clean-out and separator system of the present invention may also be utilized in a positive pressure environment instead of the negative pressure (vacuum) environment discussed above. A key aspect of the present invention is the automated, contained and isolated arrangement as shown in FIGS. 1-3, where the use of a separate collection chamber (maintained under essentially the same pressure as the separator chamber) allows for the removal and disposal of waste material without interrupting the clean-out process.

Figure 4:
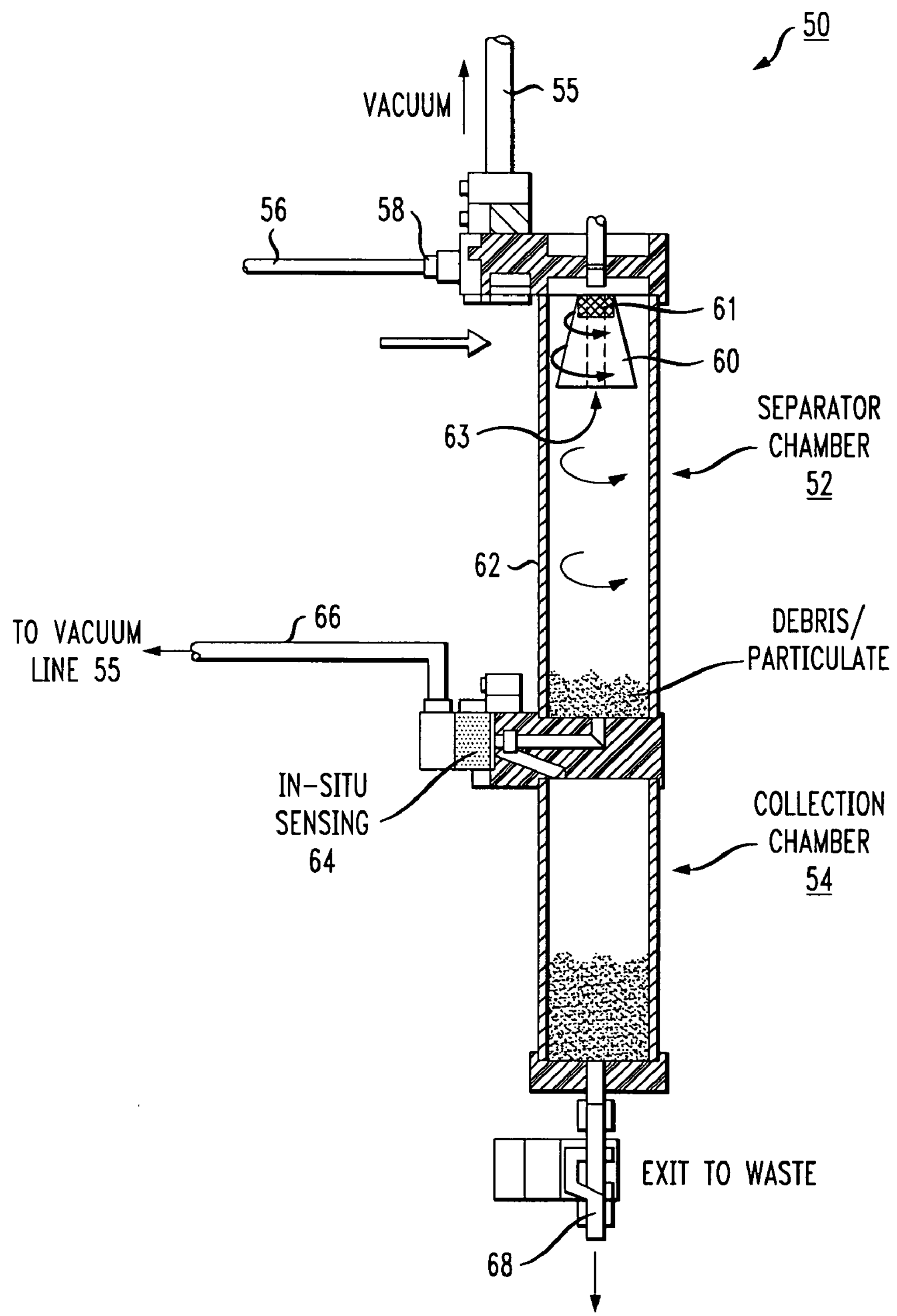
FIG. 4 illustrates an alternative embodiment of a vacuum line clean-out separator system of the present invention.

FIG. 4 illustrates an alternative vacuum line clean-out system 50 formed in accordance with the present invention. As with the embodiment discussed above, system 50 includes a separator chamber 52 and a collection chamber 54. An incoming vacuum line 56 from an industrial application (not shown) is controlled via a first valve 58 to enter separator chamber 52. In accordance with this embodiment of the present invention, a separate diverter element 60 is disposed at the intake area of separator chamber 52 and functions to induce the cyclonic flow of the incoming vacuum stream. As with the embodiment described above, the cyclonic flow of the incoming vacuum flow will force the liquid and any particulate debris against the sidewalls 62 of separator chamber 52, then fall towards the bottom thereof. The clean vacuum flow is drawn upward (e.g., through an opening 63 in diverter 60) into a clean vacuum return line 55 of system 50. As with the arrangement described above, an additional filtering element 61 may be disposed along the outlet path to ensure that any particulate remaining in the vacuum flow is prevented from entering clean vacuum return line 55.

The accumulating liquid/debris thereafter drains into the connected collection chamber 54. As with the embodiment described above, collection chamber 54 is maintained at essentially the same pressure as separator chamber 52 via a vacuum line 66 that is coupled to “clean” vacuum return line 55.

An in-situ sensing element 64 is shown in FIG. 4 as disposed between separator chamber 52 and collection chamber 54, and used to determine when a predetermined amount of debris has accumulated within collection chamber 54 and needs to be discharged. When collection chamber 54 is sufficiently “full” (as determined by sensing element 64), sensing element 64 closes the connection between separator chamber 52 and collection chamber 54, isolating the vacuum clean-out process from collection chamber 54 and allowing the accumulated waste material to be removed from collection chamber 54. As described above, a vent 66 is opened at collection chamber 54 to relieve the negative pressure and allow the waste to be discharged through a drain 68. During discharge, separator chamber 52 remains under negative pressure (by virtue of being isolated from collection chamber 54) and continues to filter the incoming waste vacuum line and return a ‘clean’ vacuum flow to return line 55.

Again, system 50 may be configured in a manner similar to the previously-described embodiment, including the use of manual controls in place of in-situ sensing element 64. Alternatively, a periodic discharge system may be employed that automatically drains the collected material in periodic time intervals. Regardless of the specific arrangement used to initiate the discharge procedure, it is a significant aspect of the present invention that the collection chamber is isolated from the separator chamber during discharge to allow for the vacuum line clean-out process to continue uninterrupted.

While the invention has been described with regard to the preferred embodiments, it is to be understood by those skilled in the art that the invention is not limited thereof, and that changes and modifications may be made thereto without departing from the spirit and scope of the present invention as defined by the following claims.

What is claimed is:

1. A vacuum line clean-out system comprising a separator chamber for receiving an incoming waste vacuum flow at an input port, the separator chamber configured to include a diverter to induce a cyclonic flow within said separator chamber and force liquid/debris present in the incoming waste vacuum flow toward a drainage port and direct a cleaned vacuum flow toward a clean vacuum outlet port; and a collection chamber coupled to the drainage port of the separator chamber for receiving the liquid/debris, the collection chamber including a vacuum outlet port to maintain a negative pressure within said collection chamber and an isolation valve to close the connection to the separator chamber and permit accumulated liquid/debris to be discharged from the collection chamber while the separator chamber continues to process incoming waste vacuum flow.

2. A vacuum line clean-out system as defined in claim 1 wherein the system further comprises a sensor coupled to the collection chamber to monitor the volume of accumulated liquid/debris and initiate a discharge procedure when a predetermined volume is present, the procedure including closing the isolation valve to de-couple the separator chamber from the collection chamber.

3. A vacuum line clean-out system as defined in claim 1 wherein the separator chamber further comprises an outlet filter coupled to the clean vacuum outlet port for preventing the entry of liquid/debris into said clean vacuum outlet port.

4. A vacuum line clean-out system as defined in claim 1 wherein the system further comprises a system sensor coupled to the separator chamber to monitor the collection of liquid/debris within the separator chamber and to shut off the system when an undesirable volume of material has accumulated therein.

5. A vacuum line clean-out system as defined in claim 4 wherein the system sensor initiates a system shut off when accumulated debris nears the clean vacuum outlet port.

6. A vacuum line clean-out system as defined in claim 1 wherein the diverter comprises inwardly tapering sidewalls formed within the separator chamber for inducing a cyclonic vacuum flow within said separator chamber.

7. A vacuum line clean-out system as defined in claim 1 wherein the diverter comprises a diverter element disposed within the separator chamber and coupled to the input port for creating a circular vacuum flow and inducing the cyclonic vacuum flow within said separator chamber.

8. A vacuum line clean-out system as defined in claim 1 wherein the system further comprises a discharge analysis unit coupled to the collection chamber for monitoring and evaluating the collected liquid/debris.

9. A vacuum line clean-out system as defined in claim 1 wherein the system further comprises a rinse element for directing a flow of rinse water through the separator and/or collection chambers.

10. A method for cleaning a vacuum intake flow to form a clean return vacuum flow, the method comprising the steps of:

introducing a vacuum flow to a separator chamber, the separator chamber including a clean vacuum return line outlet port and a drain port;

inducing a cyclonic flow within the vacuum flow to separate any contaminants from the vacuum flow, where the contaminants are directed downward to the drain port, and the cleaned vacuum is directed to the clean vacuum return line outlet port;

draining the contaminants into a collection chamber coupled to the drain port of the separator chamber, the collection chamber including a vacuum line coupled to the clean return vacuum flow and a normally open valve coupled to the separator chamber to allow for contaminants to continuously drain into the collection chamber; and maintaining a negative pressure within both the separator chamber and collection chamber to assist in the continuous draining of contaminants into the collection chamber.

11. The method as defined in claim 10, where the method further comprises the steps of:

isolating the collection chamber from the separator chamber, including de-coupling the vacuum line connection and venting the collection chamber; and discharging accumulated contaminants from the collection chamber while the isolated separator chamber continues to receive the incoming vacuum flow and create a cleaned version thereof.

12. The method as defined in claim 11, wherein the method further comprises the step of:

monitoring the accumulated contaminants within the collection chamber to determine when to initiate the steps of isolating and discharging.

13. The method as defined in claim 11, wherein the method periodically initiates the isolating and discharging steps.

14. The method as defined in claim 11 wherein the method further comprises the step of analyzing the contaminants discharged from the collection chamber.

15. The method as defined in claim 11 wherein subsequent to completing the discharging step, the method further comprises the steps of re-coupling the vacuum line connection to the collection chamber; and removing the isolation between the separator chamber and the collection chamber to restart drainage of accumulating contaminants within the collection chamber.

16. The method as defined in claim 11 wherein the method further comprises the steps of monitoring the accumulating contaminants within the separator chamber; and halting the cleaning process if the accumulating contaminants reach a predetermined level.

* * * * *